United States Patent Office 3,324,352
Patented June 6, 1967

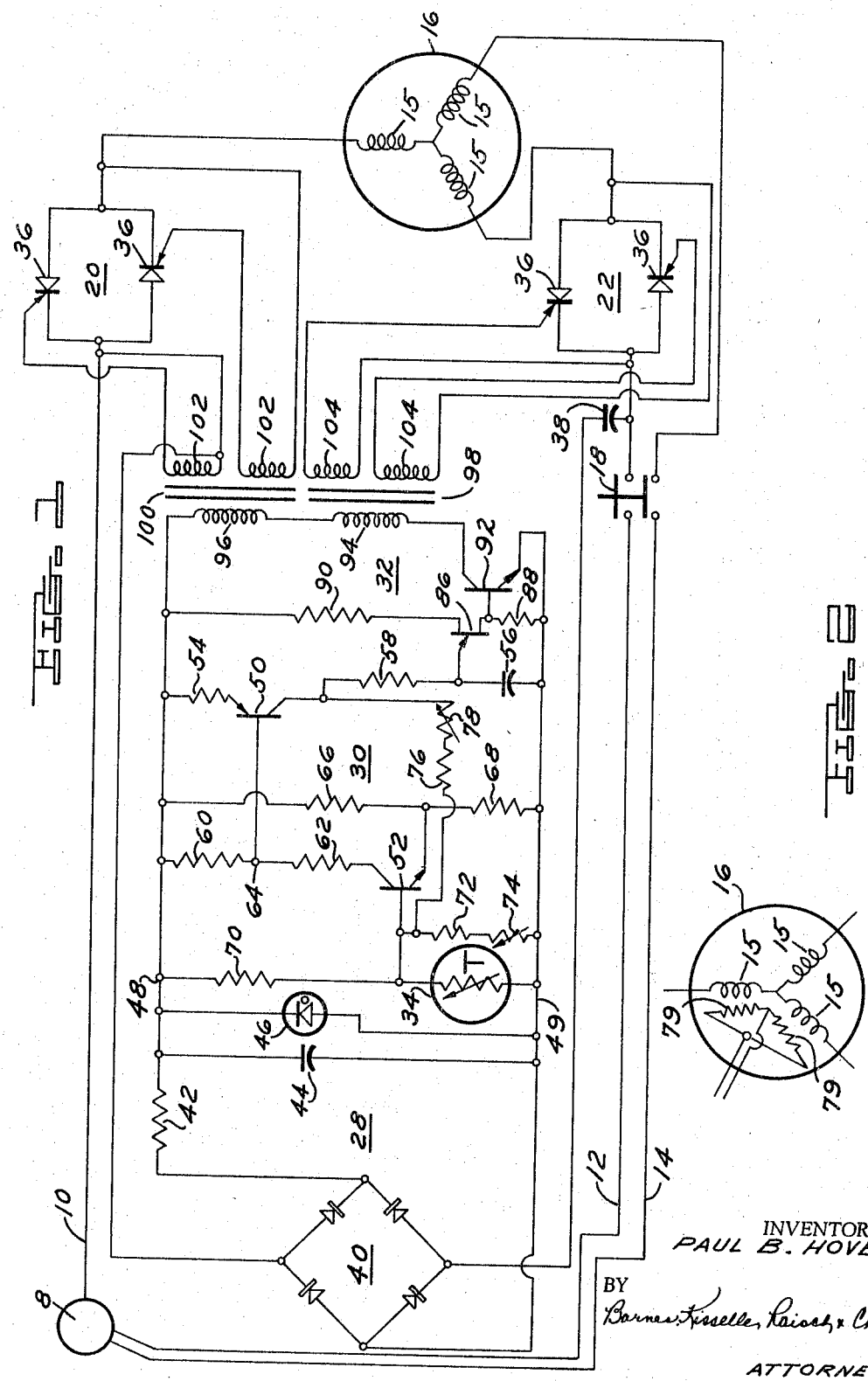

3,324,352
TEMPERATURE PROTECTION CIRCUIT
Paul B. Hover, Columbus, Ohio, assignor to Tecumseh Products Company, Tecumseh, Mich., a corporation of Michigan
Filed June 3, 1963, Ser. No. 284,932
3 Claims. (Cl. 317—13)

This invention relates to a control circuit and in particular to a circuit for protecting motor windings against excessive temperatures.

The objects of this invention are to provide a control circuit, especially suited for use as a temperature protection circuit for motor windings, that is versatile and dependable; that acts rapidly and positively in response to temperature variations which closely follow the actual temperature of the motor winding; and that provides a temperature lag after the motor has been disconnected due to excessive winding temperatures so that the motor will cool to a temperature at which it can be restarted effectively.

Another object of this invention is to provide a high gain bistable amplifier which responds rapidly and effectively to small control signals and in particular to resistance variation in a thermistor having a small thermal mass and low power consumption.

Yet another object of this invention is to provide a temperature sensing circuit that has uniform sensitivity and resistance characteristics over a wide range of temperature turn-on points and that achieves effective protection against excessive temperatures in each of a plurality of motor windings.

In the drawings:

FIG. 1 is a circuit diagram of the control circuit applied to a three-phase motor to protect against excessive motor winding temperatures.

FIG. 2 is a schematic view illustrating a thermistor circuit and also illustrating the physical location of the thermistors for protecting more than one motor winding.

By way of illustration and not for purposes of limitation, in FIG. 1 a three-phase source 8 is connected through three lines 10, 12 and 14 to the stator windings 15 of a three-phase induction motor 16. A mechanical on-off switch 18 is connected in lines 12, 14 and each of a pair of full-wave, solid-state switches 20, 22 is connected in lines 10 and 12, respectively, to control the energization of motor 16. Conduction through switches 20, 22 is controlled by a trigger circuit generally comprising a direct-current power supply 28 and a high gain bistable amplifier 30 which controls a unijunction transistor oscillator 32 in response to temperature variations in windings 15 sensed by a thermistor 34 connected to the input of amplifier 30. Oscillator 32 is a source of gating pulses for a plurality of silicon controlled rectifiers 36 in switches 20, 22. Power supply 28 is connected to one phase of source 8 through a coupling capacitor 38 and comprises a four-rectifier bridge 40 whose output is limited by a resistor 42, smoothed by a capacitor 44 and regulated by a Zener diode 46 to provide a substantially constant output across a pair of lines 48, 49.

Amplifier 30 is connected across lines 48, 49 and comprises a pair of opposite conductivity-type transistors illustrated as a P-N-P transistor 50 and an N-P-N transistor 52. The emitter-collector circuit of transistor 50 includes an emitter bias resistor 54 connected between line 48 and the emitter of transistor 50, and a capacitor 56 connected in series with a resistor 58 between the collector of transistor 50 and line 49. The base drive for transistor 50 is taken from a terminal 64 at a point electrically between a pair of resistors 60, 62 which are connected in series between line 48 and the collector of transistor 52. The emitter of transistor 52 is connected to a voltage divider bias circuit comprising resistors 66, 68 which are connected in series across lines 48, 49. A base bias circuit for transistor 52 is also connected across lines 48, 49 and comprises a resistor 70 connected in series with the parallel combination of thermistor 34 and series-connected resistors 72, 74. Positive feedback for amplifier 30 is derived through a pair of resistors 76, 78 which are connected in series directly between the collector of transistor 50 and the base of transistor 52.

Preferably, thermistor 34 comprises a pair of similar thermistors 79 (FIG. 2) each of which is embedded directly in a separate winding 15 of motor 16. Each thermistor 79 is of the type commercially known as a "bead" thermistor which has a small thermal mass, and is capable of following the temperature of winding 15 to within about five degrees. Each thermistor 79 has a negative temperature coefficient of resistance so that the resistance decreases as the temperature of windings 15 increases.

Oscillator 32 is per se conventional and generally comprises a unijunction transistor 86 having an emitter connected to the junction of resistor 58 and capacitor 56, a base-1 connected to line 49 through an output resistor 88, and a base-2 connected to line 48 through a resistor 90. The output across resistor 88 drives the base of a grounded emitter transistor amplifier 92 which has an output circuit including two primary windings 94, 96 of respective pulse transformers 98, 100. The secondaries 102, 104 of transformers 98, 100 are connected directly across the cathode and gating electrodes of rectifiers 36. Oscillator 32 is free running at a frequency about one hundred times the frequency of source 8 to eliminate any synchronizing problems and insure firing of rectifiers 36 at the beginning of the half cycles of source 8.

With the above described circuit, motor 16 is started by closing switch 18. The bias on transistor 52 controlled by the thermistor 34 is such that when the temperature of winding 15 is not excessive, conduction of transistor 52 is initiated when switch 18 is closed. As soon as transistor 52 begins conducting, transistors 50, 52 are regeneratively driven to saturation by positive feedback through resistors 76, 78. As long as transistor 50 is conducting, capacitor 56 is charged through resistor 54, the emitter-collector path of transistor 50, and resistor 58 and is discharged through the emitter to base-1 path of unijunction transistor 86 and resistor 88 in a conventional manner. The pulse output across resistor 88 is amplified by transistor amplifier 92 and the amplified pulses fire rectifiers 36 to energize windings 15 from source 8. However, if the temperature of windings 15 reaches a predetermined excessive or turn-off temperature, the resistance of thermistor 34 decreases to a value such that the bias including the feedback applied to the base of transistor 52 is insufficient to maintain transistor 52 conducting. As conduction through transistor 52 decreases, transistors 50, 52 are regeneratively driven into nonconduction. When transistor 50 is off, the charging circuit for capacitor 56 is open, oscillator 32 stops oscillating, and rectifiers 36 are not fired so that windings 15 are disconnected from source 8. As the temperature of windings 15 decreases or recedes from the turn-off temperature, the resistance of thermistor 34 increases to increase the bias voltage applied to the base of transistor 52. When the temperature of windings 15 recedes to a lower limit or turn-on temperature, determined by the values of thermistor 34 and resistors 72, 74, transistor 52 conducts and transistors 50, 52 are instantly driven to saturation by the positive feedback through resistors 76, 78. When transistors 50, 52 are again conducting, oscillator 32 again fires rectifiers 36 to energize windings 15.

With the above described circuit a temperature lag or temperature differential between turn-on and turn-off temperatures is provided by the gain of amplifier 30 and the feedback through resistors 76, 78. This differential can be varied with little effect on the turn-on temperature and similarly the turn-on temperature can be varied with little effect on the temperature differential. When transistors 50, 52 are nonconducting, the forward bias for transistor 52 is developed in the voltage dividers comprising resistors 70, 72, 74, 66, 68 and thermistor 34. For fixed values of resistors 70, 72, 74 conduction of transistor 52 is initiated and terminated by variations in the resistance of thermistor 34 which are a function of the winding temperature. Since the critical forward bias at which transistor 52 conducts is fixed, the combined resistance of the series parallel circuit comprising resistors 72, 74 and thermistor 34 must reach a constant value corresponding to the forward bias before transistor 52 will conduct. Resistor 74, illustrated as a variable resistor, may be varied to change the turn-on temperature at which conduction of transistor 52 is initiated. Since the combined resistance of resistors 72, 74 and thermistor 34 at the critical forward bias is constant, variations in resistor 74 only slightly affect the temperature difference set by the gain and the feedback of amplifier 30.

When transistors 50, 52 are conducting the bias at the base of transistor 52 is raised by the feedback through resistors 76, 78 to a value above the critical forward bias corresponding to the turn-on temperature. Before transistors 50, 52 will be rendered nonconducting, the resistance of thermistor 34 must decrease below its value at the turn-on temperature to overcome the positive feedback through resistors 76, 78. By varying the feedback which depends on the value of resistor 78, illustrated as a variable resistor, the temperature difference can be changed. Since the turn-on temperature is determined by the parallel combination of thermistor 34 and resistors 72, 74, variations in resistor 78 will only slightly affect the turn-on temperature. By connecting series resistors 72, 74 in parallel with thermistor 34 a smooth resistance versus temperature curve for the parallel combination of thermistor 34, resistors 72, 74 is achieved.

When the control circuit described hereinbefore is used with a small dimensioned thermistor, commercially known as a "bead" thermistor, extremely effective control is achieved. The bead-type thermistor has physical dimensions small enough so that it can be embedded directly within the winding and also has a thermal mass small enough so that the temperature of the thermistor will accurately follow the winding temperature to within five degrees. This response is fast enough to protect the winding against rapid heating caused by locked rotor conditions and therefore eliminates the need for a current responsive relay in addition to a temperature sensing device of the type which does not act fast enough to respond to heating caused by locked rotor current. A power gain of several thousands is easily obtained by using a regenerative amplifier. The relatively small output from the bead-type thermistor provides extremely effective control as the amplifier 30 switches rapidly from a nonconducting condition to a saturated condition.

By way of example and not for purposes of limitation each of the thermistors 79 may be of the type sold commercially by the Victory Engineering Corporation, and identified as 35A1. With a five horsepower, three phase, 230 volt motor, with locked rotor from a warm start, a turn-on temperature of 250 degrees F. and a turn-off temperature of 275 degrees F. was obtained with the circuit of FIG. 1 having the following circuit values:

| | |
|---|---|
| Input at terminals 48, 49 | 22 v. D.C. |
| Resistor 54 | 1,000 ohms. |
| Resistor 58 | 2,700 ohms. |
| Capacitor 56 | 0.02 µf. |
| Resistor 60 | 4,700 ohms. |
| Resistor 62 | 22,000 ohms. |
| Resistor 68 | 47 ohms. |
| Resistor 66 | 22,000 ohms. |
| Resistor 70 | 15,000 ohms. |
| Resistor 72 | 1,000 ohms. |
| Resistor 74 | 200 ohms. |
| Resistor 76 | 10,000 ohms. |
| Resistor 78 | 8,000 ohms. |
| Transistor 50 | 2N328A. |
| Transistor 52 | TI483. |
| Thermistor 34 | 5,000 ohms at 77 degrees F., 260 ohms at 250 degrees F. (two VECO 35A1 in parallel). |

With the temperature lag between turn-on and turn-off temperatures, the motor can be restarted effectively and will not be disconnected due to slight temperature increases caused by starting currents.

Although the above circuit has been disclosed in conjunction with a temperature protection circuit for a three-phase motor 16, the control achieved by differential operation may be used in applications other than temperature protection. Additionally, although the temperature responsive element has been disclosed as a pair of thermistors embedded in separate windings, good protection can be achieved with other configurations, as for example a single thermistor embedded in one winding of a single or multiple phase motor or a single thermistor positioned between the windings of a single phase motor.

I claim:

1. In combination a motor having a winding, a source of alternating current electrical energy for energizing said winding, means for deenergizing said winding when the temperature of said winding becomes excessive until after said winding has cooled to a temperature where said motor can be restarted effectively, said winding de-energizing means comprising a thermistor embedded directly in said winding, a bistable amplifier having an input connected to said thermistor, a free running oscillator coupled to the output of said amplifier operable to produce a triggering output signal at a frequency greatly in excess of the frequency of said source, and a full-wave switching device connected between said winding and said source and also coupled to said oscillator for conduction initiated by said triggering output signal of said oscillator, said amplifier having first and second stable conditions, biasing means for said amplifier input including feedback means coupled between the output and input of said amplifier and including said thermistor for switching said amplifier from said first stable condition to said second stable condition when the temperature of said winding reaches said excessive temperature and for switching said amplifier from said second stable condition to said first stable condition when the temperature of said winding recedes to said restart temperature.

2. In the combination set forth in claim 1 wherein said amplifier comprises first and second opposite conductivity-type transistors connected in cascade, each of said transistors having an emitter, a base and a collector, said first transistor having an emitter-base circuit comprising said thermistor connected in parallel with an impedance, said parallel circuit being adapted to establish one of said temperatures, said feedback means comprising a positive feedback circuit coupled between said collector of said second transistor and said base of said first transistor to provide positive feedback for said amplifier, said feedback circuit having an impedance therein for establishing a difference between said excessive temperature and said restart temperature.

3. In combination, a load, switch means for connecting and disconnecting said load to and from a source of electrical energy, and means for opening said switch means at one temperature limit of a predetermined range of temperatures at said load and for closing said switch means when the temperature of said load has receded from said one limit to an opposite limit of said predetermined temperature range, said switch opening and closing means comprising a bistable amplifier, means for switching said amplifier from a first stable condition to a second stable condition when the temperature of said load is at said one temperature limit and for switching said amplifier from said second stable condition to said first stable condition when the temperature of said load recedes to said opposite temperature limit, said amplifier switching means comprising means including a thermistor for sensing the temperature at said load, said switch opening and closing means further comprising a unijunction transistor oscillator having a capacitor therein, and said amplifier comprising a first and a second transistor connected in cascade, said transistors being of opposite conductivity, each of said transistors having an emitter, a base, and a collector, said first transistor having an emitter-base circuit comprising said thermistor connected in parallel with an impedance, said parallel circuit being adapted to establish one of said temperature limits, a positive feedback circuit coupled between the emitter-collector circuit of said second transistor and the emitter-base circuit of said first transistor, said feedback circuit having an impedance therein for establishing a temperature difference between said one temperature limit and said opposite temperature limit, the emitter-collector circuit of said second transistor being connected in series with said capacitor to provide a charging circuit for said capacitor, and the output of said oscillator being coupled to said switch means for opening and closing said switch means.

References Cited

UNITED STATES PATENTS

| | | | |
|---|---|---|---|
| 2,925,548 | 2/1960 | Scherer | 323—22 |
| 3,032,690 | 5/1962 | Elliott | 317—13 |
| 3,076,135 | 1/1963 | Farnsworth et al. | 323—22 |
| 3,079,543 | 2/1963 | Decker | 323—22 |
| 3,104,353 | 9/1963 | Theobald | 323—22 |
| 3,120,635 | 2/1964 | Tully | 323—22 |
| 3,122,697 | 2/1964 | Kanders | 317—22 X |
| 3,262,014 | 7/1966 | Conner | 317—13 |

MILTON O. HIRSHFIELD, *Primary Examiner.*

SAMUEL BERNSTEIN, *Examiner.*

J. D. TRAMMELL, *Assistant Examiner.*